(12) United States Patent
Zhu et al.

(10) Patent No.: US 11,029,251 B2
(45) Date of Patent: Jun. 8, 2021

(54) METHOD FOR ESTIMATING ABOVEGROUND BIOMASS OF RICE BASED ON MULTI-SPECTRAL IMAGES OF UNMANNED AERIAL VEHICLE

(71) Applicant: NANJING AGRICULTURAL UNIVERSITY, Jiangsu (CN)

(72) Inventors: Yan Zhu, Nanjing (CN); Hengbiao Zheng, Nanjing (CN); Tao Cheng, Nanjing (CN); Xia Yao, Nanjing (CN); Yongchao Tian, Nanjing (CN); Weixing Cao, Nanjing (CN)

(73) Assignee: NANJING AGRICULTURAL UNIVERSITY, Nanjing (CN)

( * ) Notice: Subject to any disclaimer, the term of this patent is extended or adjusted under 35 U.S.C. 154(b) by 70 days.

(21) Appl. No.: 16/675,612

(22) Filed: Nov. 6, 2019

(65) Prior Publication Data
US 2020/0141877 A1    May 7, 2020

(30) Foreign Application Priority Data
Nov. 6, 2018 (CN) .......................... 201811312158.7

(51) Int. Cl.
*G06T 7/62* (2017.01)
*G01N 21/84* (2006.01)
(Continued)

(52) U.S. Cl.
CPC ............. *G01N 21/84* (2013.01); *A01G 22/22* (2018.02); *B64C 39/02* (2013.01); *G01N 21/25* (2013.01);
(Continued)

(58) Field of Classification Search
CPC .................. G01N 21/84; G01N 21/25; G01N 2021/8466; G01N 21/31; G06T 7/62;
(Continued)

(56) References Cited

U.S. PATENT DOCUMENTS

2016/0084635 A1* 3/2016 Pittman .................. G01B 21/02
356/72

FOREIGN PATENT DOCUMENTS

CN    1837787 A    9/2006
CN    101986139 A    3/2011
(Continued)

OTHER PUBLICATIONS

Cutler, et al. "Estimating tropical forest biomass with a combination of SAR image texture and Landsat TM data: An assessment of predictions between regions". ISPRS Journal of Photogrammetry and Remote Sensing, 70, pp. 66-77, 2012.
(Continued)

*Primary Examiner* — Christopher M Brandt
(74) *Attorney, Agent, or Firm* — Oliff PLC

(57) ABSTRACT

A method for estimating the aboveground biomass of rice based on multi-spectral images of an unmanned aerial vehicle (UAV), including: normatively collecting UAV multi-spectral image data of rice canopy and ground measured biomass data; after collection, preprocessing images, extracting reflectivity and texture feature parameters, calculating a vegetation index, and constructing a new texture index; and by stepwise multiple regression analysis, integrating the vegetation index and the texture index to estimate rice biomass, and establishing a multivariate linear model for estimating biomass. A new estimation model is verified for accuracy by a cross-validation method. The method has high estimation accuracy and less requirements on input data, and is suitable for the whole growth period of rice. Estimating rice biomass by integrating UAV spectrum
(Continued)

and texture information is proposed for the first time, and can be widely used for monitoring crop growth by UAV remote sensing.

8 Claims, 2 Drawing Sheets

(51) Int. Cl.
*A01G 22/22* (2018.01)
*B64C 39/02* (2006.01)
*G01N 21/25* (2006.01)
*G06T 5/00* (2006.01)
*G06T 7/40* (2017.01)

(52) U.S. Cl.
CPC .............. *G06T 5/002* (2013.01); *G06T 5/006* (2013.01); *G06T 7/40* (2013.01); *G06T 7/62* (2017.01); *B64C 2201/123* (2013.01); *G01N 2021/8466* (2013.01); *G06T 2207/10036* (2013.01); *G06T 2207/30188* (2013.01)

(58) Field of Classification Search
CPC .......... G06T 5/002; G06T 5/006; G06T 7/40; G06T 2207/10036; G06T 2207/30188; G06T 7/45; G06T 7/0002; A01G 22/22; A01G 22/00; B64C 39/02; B64C 2201/123; B64C 39/024; G06K 9/2018; G06K 2009/00644; G06K 9/00657
See application file for complete search history.

(56) References Cited

FOREIGN PATENT DOCUMENTS

| | | | |
|---|---|---|---|
| CN | 102207453 | A | 10/2011 |
| CN | 102393238 | A | 3/2012 |
| CN | 102829739 | A | 12/2012 |
| CN | 105608293 | A | 5/2016 |
| CN | 105842707 | A | 8/2016 |
| CN | 106291582 | A | 1/2017 |
| CN | 106384332 | A | 2/2017 |
| CN | 107449400 | A | 12/2017 |
| CN | 107833201 | A | 3/2018 |
| CN | 108007438 | A | 5/2018 |
| CN | 108020211 | A | 5/2018 |

OTHER PUBLICATIONS

Liu Chang, et al. "Biomass Estimation in Winter Wheat by UAV Spectral Information and Texture Information Fusion". Scientia Agricultura Sinica, pp. 3060-3073, 2018.

Guo Peng, et al. "Comparison of farmland crop classification methods based on visible light images of unmanned aerial vehicles". Transactions of the Chinese Society of Agricultural Engineering. vol. 33, No. 13, pp. 112-119, 2017.

\* cited by examiner

METHOD FOR ESTIMATING ABOVEGROUND BIOMASS OF RICE BASED ON MULTI-SPECTRAL IMAGES OF UNMANNED AERIAL VEHICLE

BACKGROUND

Technical Field

The present invention belongs to the field of crop growth monitoring, in particular to a method for estimating the aboveground biomass of rice based on multi-spectral images of an unmanned aerial vehicle (UAV).

Related Art

Rice is one of the most popular grain corps in the world. More than half of the world's population depends on rice, so rice production plays an important role in global food safety and sustainable development. Accurate crop management is a prerequisite for a high yield of rice. Aboveground biomass is an important indicator for crop growth monitoring and has a significant impact on yield formation. At the same time, biomass and nitrogen content together determine a nitrogen dilution curve, from which critical nitrogen concentration can be obtained, and then a nitrogen nutrition index is calculated for nitrogen management. Therefore, accurate and non-destructive monitoring of crop population biomass plays an important role in the field of precision agriculture.

The remote sensing technology has been widely used in biomass estimation, and there are many monitoring methods available at present. The most commonly used are portable spectrometers that use active sensors (such as GreenSeeker and Crop Circle) or passive sensors (such as ASD FieldSpec spectrometer). Although these sensors are easy to operate and have high monitoring accuracy, they are difficult to apply in large areas and are less efficient when applied to a large number of fields in agricultural parks. Satellite imagery can monitor crop biomass on a large scale, but the image has low temporal-spatial resolution and a high spatial resolution image is expensive, resulting in low estimation accuracy. In recent years, UAVs have provided new tools for crop biomass estimation.

Some foreign scholars load digital cameras on UAVs to monitor crop biomass, and found that a Normalized Green-Red Difference Index (NGRDI) has a good correlation with biomass before crop closure. Some scholars have found that a red-blue ratio index extracted by RGB images of UAVs is closely related to winter wheat biomass. However, these estimating models are only applicable to a single growth period, and a monitoring model for a whole growth period needs to be constructed. In addition, some scholars use the UAV RGB images to construct a crop surface model to extract crop plant height information, and then use the plant height to estimate biomass, which has a better effect. However, the construction of the crop surface model requires image stitching and digital elevation models, which are time-consuming. Compared to canopy structure information, spectral information of UAV images can be directly used to estimate biomass, even if there are only three bands. Previous studies have found that the near-infrared and red-side bands are more effective in estimating biomass than red, green and blue bands of digital images. In addition, most of the existing studies have only used the spectral and structural information of the UAV images, and the inherent spatial information in the images has not been utilized. Therefore, making full use of the multi-spectral image data of UAVs is of great significance to rapid and accurate estimation of crop biomass.

Texture analysis is an image analysis technique that measures pixel values and adjacent pixel differences and is widely used in image classification. At the beginning of this century, some scholars used the texture information of satellite images to estimate the aboveground biomass of forests. They found that the texture features were not only significantly correlated with the biomass of mature forests, but also were superior to spectral information in biomass estimation. In addition, some scholars systematically compared the performance of a simple spectral ratio, a common vegetation index, a texture feature and a ratio texture feature on forest biomass estimation, and found that the ratio texture feature can significantly improve the biomass estimation accuracy.

Predecessors mainly used the texture features of satellite images to estimate forest biomass. Few studies have used ultra-high resolution UAV images to estimate rice biomass. In addition, the traditional spectral index has a poorer monitoring effect under high biomass, especially at the growth period of rice after heading. Given these constraints, it is highly desirable to develop techniques that can accurately monitor biomass under high biomass conditions.

SUMMARY

The present invention aims to provide a method for estimating the aboveground biomass of rice based on multi-spectral images of a UAV, which has low input data requirements, high estimation accuracy, and suitability for a whole growth period of rice.

The technical solution to achieve the object of the present invention is:

a method for estimating the aboveground biomass of rice based on multi-spectral images of a UAV, includes:

step 1: collecting rice canopy multi-spectral image data by a UAV, and randomly and destructively sampling rice plants to obtain rice plant samples;

step 2: preprocessing the rice canopy multi-spectral image data, specifically including the steps of removing noise, correcting halation, correcting lens distortion and correcting radiation to obtain reflectivity data of a rice canopy multi-spectral image;

step 3: performing data processing on rice canopy multi-spectral image reflectivity data, specifically including the steps of extracting reflectivity, calculating texture feature parameters, calculating a vegetation index and calculating a texture index, and simultaneously measuring biomass data of the rice plant samples;

step 3-1: extracting reflectivity of each region according to the region of interest (ROI), where the region is defined as an area of 5 m×6 m;

step 3-2: calculating the vegetation index correlated to biomass estimation according to the reflectivity in step 3-1;

step 3-3: calculating 8 texture feature parameters based on the gray-level co-occurrence matrix on a reflectivity image;

step 3-4: constructing a normalized difference texture index NDTI, NDTI=(T1−T2)/(T1+T2) according to a single texture feature parameter, where T1 and T2 are respectively a certain texture feature parameter at an arbitrary band;

step 3-5: rooting and washing the rice plant samples, performing fixation and drying in an oven, and weighing the rice plant samples to obtain the aboveground biomass data of the rice plant samples;

step 4: performing a correlation analysis on a spectral index, the single texture feature parameter, the texture index and the aboveground biomass; at the same time, performing a stepwise multiple linear regression analysis by using a data analysis software SPSS and combining the spectral index and the texture index to obtain a rice biomass estimation model, and calculating a coefficient of determination $R^2$; and evaluating performance of different regression analysis models on rice biomass estimation by comparing $R^2$;

step 5: according to field test data, verifying accuracy of the rice biomass estimation model by a cross-validation method, and calculating a relative root mean square error (RMSE):

$$RMSE = \sqrt{\frac{1}{n}\sum_{i=1}^{n}(P_i - O_i)^2}$$

where $P_i$ and $O_i$ are predicted and measured values of the ith sample respectively, and n is a total number of samples; and step 6: by comparing the RMSE of different estimation models, obtaining an optimal rice aboveground biomass estimation model:

$$AGB(t\ ha^{-1}) = e^{(4.179 \times NDTI(Mean800, Mean550) - 2.559 \times NDTI(Mean800, Mean720) + 1.924 \times MTVI2 - 0.644)}$$

where NDTI ($Mean_{800}$, $Mean_{550}$) is a texture index constructed by Mean texture feature parameters at an 800 nm band and a 550 nm band, NDTI ($Mean_{800}$, $Mean_{720}$) is a texture index constructed by the Mean texture feature parameters at the 800 nm and 720 nm bands, MTVI2 is a modified triangular vegetation index, and AGB is the aboveground biomass of rice.

Compared with the prior art, the present invention has the following technical effects:

1. The method for estimating the aboveground biomass of rice based on the multi-spectral images of a UAV consistent with the present invention has low input data requirements and high estimation accuracy.

2. The method for estimating the aboveground biomass of rice based on the multi-spectral images of a UAV consistent with the present invention combines the spectral and texture information of the UAV images to estimate the aboveground biomass of the rice, and is suitable for the whole growth period of the rice.

3. The method for estimating the aboveground biomass of rice based on the multi-spectral images of a UAV consistent with the present invention can accurately monitor rice biomass during the whole growth period with only one model, and can provide a useful reference for crop growth monitoring.

DETAILED DESCRIPTION

Figure 1:
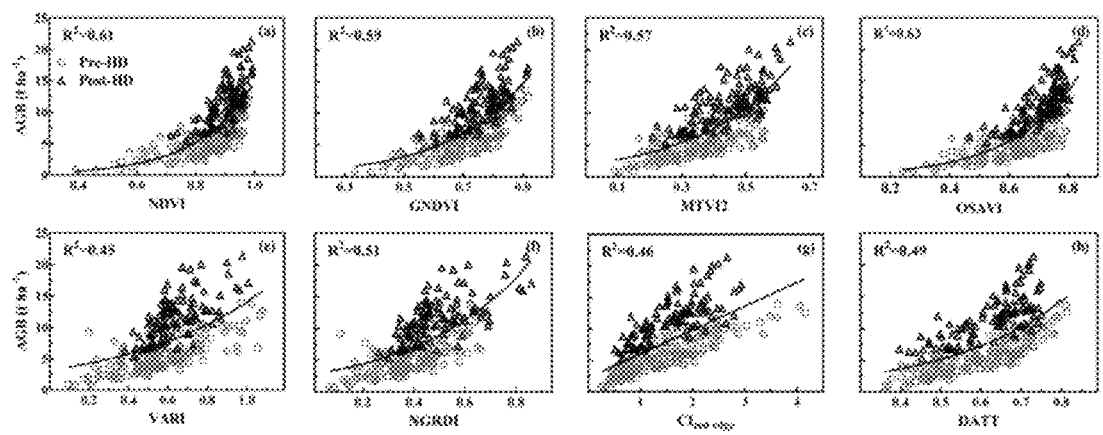
FIG. 1 shows a relationship between aboveground biomass (t ha$^{-1}$) and a vegetation index: NDVI (a); GNDVI (b); MTVI2 (c); OSAVI (d); VARI (e); NGRDI (f); $CI_{red\ edge}$ (g) and DATT (h), Pre-HD and Post-HD representing before heading and after heading.

The following describes implementations of the present invention in detail. Examples of the implementations are shown in the accompanying drawings, and same or similar reference signs in all the accompanying drawings indicate same or similar components or components having same or similar functions. The implementations that are described with reference to the accompany drawings are exemplary, and are only used to interpret the present invention, instead limiting the present invention.

Embodiment 1

The method of present invention is performed based on rice field trials treated under different growth stages, different nitrogen application levels and different planting densities, and the specific expressions are shown in Tables 1 and 2:

TABLE 1

Basic information of rice test fields

| No. | Year | Location | Variety | Treatment | Sowing time | Transplanting time |
|---|---|---|---|---|---|---|
| Exp. 1 | 2015 | Baipu Town, Rugao City, Jiangsu Province (120°45' E, 32°16' N) | Japonica rice (Wuyunjing 24); Indica rice (Y Liangyou 1) | Nitrogen level (kg ha$^{-1}$): 0, 100, 200, 300. Density: 0.30 m × 0.15 m 0.50 m × 0.15 m | May 16 | June 15 |
| Exp. 2 | 2016 | Baipu Town, Rugao City, Jiangsu Province (120°45' E, 32°16' N) | Japonica rice (Wuyunjing 24); Indica rice (Y Liangyou 1) | Nitrogen level (kg ha$^{-1}$): 0, 150, 300. Density: 0.30 m × 0.15 m 0.50 m × 0.15 m | May 18 | June 17 |

TABLE 2

Data collection of rice canopy images and agronomic parameters

| Acquisition date of UAV images | Sampling date | Growth period | Data volume |
|---|---|---|---|
| Aug. 5, 2015 | Jul. 31, 2015 | Jointing stage | 1 UAV multi-spectral image, 36 pieces of biomass data |
| Aug. 14, 2015 | Aug. 15, 2015 | Booting stage | 1 UAV multi-spectral image, 36 pieces of biomass data |
| Aug. 26, 2015 | Aug. 26, 2015 | Late booting stage | 1 UAV multi-spectral image, 36 pieces of biomass data |
| Sep. 9, 2015 | Sep. 10, 2015 | Filling stage | 1 UAV multi-spectral image, 36 pieces of biomass data |
| Aug. 6, 2016 | Aug. 6, 2016 | Jointing stage | 1 UAV multi-spectral image, 36 pieces of biomass data |
| Aug. 14, 2016 | Aug. 14, 2016 | Booting stage | 1 UAV multi-spectral image, 36 pieces of biomass data |
| Aug. 28, 2016 | Aug. 28, 2016 | Heading stage | 1 UAV multi-spectral image, 36 pieces of biomass data |
| Sep. 8, 2016 | Sep. 8, 2016 | Filling stage | 1 UAV multi-spectral image, 36 pieces of biomass data |

Multi-spectral image data of rice canopy was obtained from rice fields Exp.1 and Exp.2. The data acquisition is systematic, two main rice varieties are covered, the main growth stages are included, the sample size is large, the treatment factors are many, and the accuracy and adaptability of an identification method consistent with the present invention under different environmental conditions and treatment can be effectively verified.

A method for estimating the aboveground biomass of rice based on multi-spectral images of a UAV, includes:

Step 1. Data collection:

An 8-rotor UAV MK-Oktokopter produced by HiSystems GmBH is equipped with a six-band multi-spectral camera to obtain rice canopy images at a height of 100 m. The six spectral bands collected are 490 nm, 550 nm, 680 nm, 720 nm, 800 nm and 900 nm respectively in the range of 360-1025 nm, and the bandwidth is 10 nm. The multi-spectral camera has an angle of view of 38°×31°, a spatial resolution of approximately 5.4 cm, and an image size of 69×55 m. The exposure time of the multi-spectral camera is manually set to suit natural light radiation conditions in the field. And the exposure time in sunny and cloudless weather is usually about 2 ms. The flight path and the flight speed of the UAV are consistent throughout the whole growth period, and the flight time is 11:00-13:30 at noon. The data is from rice fields of different growth stages, different nitrogen application levels, different planting density treatments, and different rice varieties, wherein the growth stages include a jointing stage, a booting stage, a heading stage and a filling stage.

At the same time, three rice plant samples are randomly selected from each region, uprooted and placed in a bucket, and transported indoors for biomass measurement.

Step 2: Image data preprocessing is mainly performed in four steps to obtain reflectivity data of a rice canopy multi-spectral image:

1. Noise removal: firstly, different exposure times are set for a camera in a darkroom, 100 photos are taken, and a DN value of the image is extracted as a noise file; noise removal is performed by subtracting a noise image from an original image.

2. Halation correction: firstly, an integrating sphere is used to obtain an image of the camera under a uniform light source, and a halation correction coefficient is obtained; halation correction is performed by multiplying the image with the noise removed by the correction coefficient.

3. Lens distortion correction: firstly, internal and external parameters of a lens are obtained by using a black and white checkerboard pattern, and then lens distortion is corrected with a Brown model.

4. Radiation correction: by an empirical linear method, radiation is corrected by 6 correction white cloths with different standard reflectivity (3%, 6%, 12%, 22%, 48% and 56%) to obtain the final reflectivity image.

Step 3. Reflectivity data processing is mainly performed in five steps:

1. Reflectivity extraction: the reflectivity of each region is extracted by the region of interest (ROI), where the region is defined as an area of 5 m×6 m.

2. Vegetation index calculation: the vegetation index correlated with biomass estimation is calculated by the reflectivity.

FIG. 1 shows a graph of a relationship between aboveground biomass (t ha$^{-1}$) and a vegetation index: NDVI (a); GNDVI (b); MTVI2 (c); OSAVI (d); VARI (e); NGRDI (f); $CI_{red\ edge}$ (g) and DATT (h), Pre-HD and Post-HD representing before heading and after heading.

3. Texture feature parameter extraction: 8 texture parameters based on a gray-level co-occurrence matrix on a reflectivity image are calculated using an ENVI software: mean, variance, uniformity, contrast, heterogeneity, entropy, angular second moment and correlation, where the mean reflects an average of texture, the variance reflects magnitudes of texture change, the uniformity reflects homogeneity of local texture, the contrast reflects sharpness of the texture, the heterogeneity is used to detect similarity, the entropy reflects a degree of non-uniformity or complexity of the texture in the image, the angular second moment reflects uniformity of gray-level distribution and thickness of the texture of the image, and the correlation reflects consistency of the image texture.

4. Texture index calculation: a normalized difference texture index NDTI=(T1−T2)/(T1+T2) is constructed by a single texture feature parameter algorithm, where T1 and T2 are respectively a certain texture feature parameter at an arbitrary band.

Figure 2:
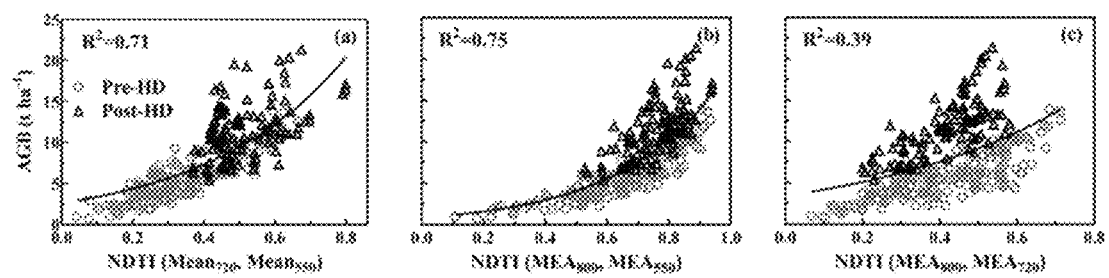
FIG. 2 shows a relationship between aboveground biomass (t ha$^{-1}$) and a texture index: (a) NDTI ($Mean_{720}$, $Mean_{550}$); (b) NDTI ($Mean_{800}$, $Mean_{550}$) and (c) NDTI ($Mean_{800}$, $Mean_{720}$), Pre-HD and Post-HD representing before heading and after heading.

FIG. 2 shows a graph of a relationship between aboveground biomass (t ha$^{-1}$) and a texture index: (a) NDTI (Mean$_{720}$, Mean$_{550}$); (b) NDTI (Mean$_{800}$, Mean$_{550}$) and (c) NDTI (Mean$_{800}$, Mean$_{720}$), Pre-HD and Post-HD representing before heading and after heading.

5. The destructively sampled plants are rooted and washed, placed in an oven, firstly subjected to fixation at 108° C. for 30 min, then dried at 80° C. to constant weight, and weighed to obtain aboveground biomass data.

Step 4. Data Analysis:

A correlation analysis is performed on a spectral index, a single texture feature parameter, a texture index and the aboveground biomass of rice. At the same time, a stepwise multiple linear regression analysis is performed by using a data analysis software SPSS and combining the spectral index and the texture index. The performance of different methods on biomass estimation is evaluated according to a coefficient of determination ($R^2$).

$$R^2 = 1 - \frac{\sum_i (y_i - y'_i)^2}{\sum_i (y_i - \bar{y})^2}$$

where $y_i$ and $y'_i$ are measured and predicted values of an ith sample respectively, $\bar{y}$ is an average of the measured values, and n is the total number of the samples.

Figure 3:
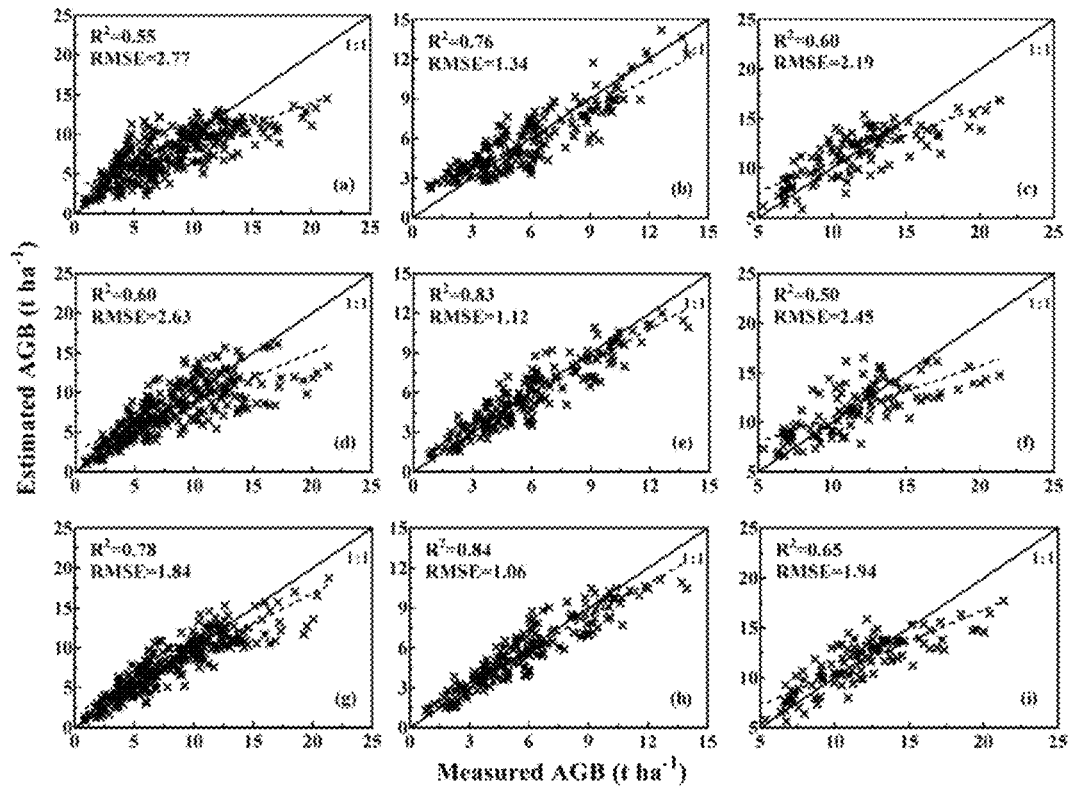
FIG. 3 shows a test of a vegetation index, a texture index and a multiple linear regression equation with the best performance in a whole growth period and divided time periods: $CI_{red\ edge}$ before heading (b), OSAVI after heading (c), whole growth period NDTI ($Mean_{800}$, $Mean_{550}$) (d), NDTI ($Mean_{800}$, $Mean_{550}$) before heading (e), NDTI ($Mean_{800}$, $Mean_{720}$) after heading (f), whole growth period model constructed by NDTI ($Mean_{800}$, $Mean_{550}$), NDTI ($Mean_{800}$, $Mean_{720}$) and MTVI2 (g), before heading (h) and after heading (i).

FIG. 3 shows a test pattern of the vegetation index, the texture index and a multiple linear regression equation with the best performance in the whole growth period and divided time periods: whole growth period OSAVI (a), $CI_{red\ edge}$ before heading (b), OSAVI after heading (c), whole growth period NDTI ($Mean_{800}$, $Mean_{550}$) (d), NDTI ($Mean_{800}$, $Mean_{550}$) before heading (e), NDTI ($Mean_{800}$, $Mean_{720}$) after heading (f), whole growth period model constructed by NDTI ($Mean_{800}$, $Mean_{550}$), NDTI ($Mean_{800}$, $Mean_{720}$) and MTVI2 (g), before heading (h) and after heading (i).

Step 5: according to field test data, accuracy of the rice biomass estimation model is verified by a cross-validation method, and a relative root mean square error (RMSE) is calculated:

$$RMSE = \sqrt{\frac{1}{n} \sum_{i=1}^{n} (P_i - O_i)^2}$$

where $P_i$ and $O_i$ are the predicted and measured values of the ith sample respectively, and n is the total number of samples.

Step 5. Accuracy test:

The accuracy of the constructed estimation models is verified by the cross-validation method, and a best model is determined according to an RMSE value. The smaller the RMSE value, the higher the accuracy of the model.

By comparing the verification result RMSE values of the models, an optimized soil adjusted vegetation index (OSAVI) of the best spectral index for biomass estimation in the rice whole growth period is obtained, the verification accuracy is $R^2=0.55$, RMSE=2.77 t ha$^{-1}$, the best texture index is (NDTI ($Mean_{800}$, $Mean_{550}$)), the verification accuracy is $R^2=0.60$, RMSE=2.63 t ha$^{-1}$, and the verification accuracy of the best multivariate model is $R^2=0.78$, RMSE=1.84 t ha$^{-1}$.

Step 6. Construction of an optimal biomass estimation model:

A biomass estimation model with the texture index NDTI ($Mean_{800}$, $Mean_{550}$), texture index NDTI ($Mean_{800}$, $Mean_{720}$) and modified triangular vegetation index 2 (MTVI2) suitable for the whole growth period is calculated by the following formula:

$$AGB(t\ ha^{-1}) = e^{(4.179 \times NDTI(Mean800,Mean550) - 2.559 \times NDTI(Mean800,Mean720) + 1.924 \times MTVI2 - 0.644)}$$

Figure 4:
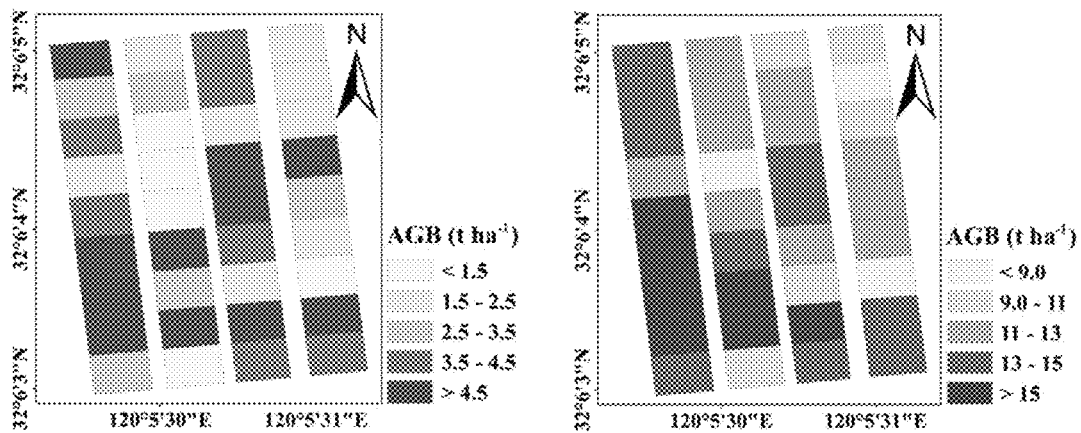
FIG. 4 is a biomass inversion chart of a best estimation model at jointing and filling stages.

FIG. 4 shows a biomass inversion chart of the best estimation model at the jointing stage (left) and the filling stage (right).

The best biomass estimation models for different growth stages are shown in the table below:

Table Best biomass estimation models for different growth stages

| Growth period | Regulation $R^2$ | RMSE (t ha$^{-1}$) | Variable and intercept | Coefficient | P-level | Tolerance | Variance inflation factor |
|---|---|---|---|---|---|---|---|
| Whole growth period | 0.86 | 1.26 | Intercept | −0.644 | 0.000 | | |
| | | | NDTI ($Mean_{800}$, $Mean_{550}$) | 4.179 | 0.000 | 0.239 | 4.183 |
| | | | NDTI ($Mean_{800}$, $Mean_{720}$) | −2.559 | 0.000 | 0.247 | 4.045 |
| | | | MTVI2 | 1.924 | 0.000 | 0.406 | 2.462 |
| Before heading | 0.87 | 0.121 | Intercept | 0.414 | 0.000 | | |
| | | | NDTI ($Mean_{800}$, $Mean_{550}$) | 4.634 | 0.000 | 0.102 | 9.812 |
| | | | GNDVI | −2.547 | 0.000 | 0.102 | 9.812 |
| After heading | 0.72 | 0.17 | Intercept | −0.203 | 0.000 | | |
| | | | OSAVI | 2.433 | 0.000 | 0.608 | 1.645 |
| | | | NDTI ($Mean_{800}$, $Mean_{550}$) | 1.176 | 0.000 | 0.608 | 1.645 |

The foregoing descriptions are merely some implementations of the present invention. It should be noted that a person of ordinary skill in the art may make several improvements without departing from the principle of the present invention and the improvements shall fall within the protection scope of the present invention.

What is claimed is:

1. A method for estimating the aboveground biomass of rice based on multi-spectral images of an unmanned aerial vehicle (UAV), comprising:
    step 1: collecting rice canopy multi-spectral image data by a UAV, and randomly and destructively sampling rice plants to obtain rice plant samples;
    step 2: preprocessing the rice canopy multi-spectral image data, specifically comprising the steps of removing noise, correcting halation, correcting lens distortion and correcting radiation to obtain reflectivity data of a rice canopy multi-spectral image;
    step 3: performing data processing on the rice canopy multi-spectral image reflectivity data, specifically comprising the steps of extracting reflectivity, calculating texture feature parameters, calculating a vegetation index and calculating a texture index, and simultaneously measuring biomass data of the rice plant samples;
    step 3-1: extracting reflectivity of each region according to the region of interest (ROI), where the region is defined as an area of 5 m×6 m;
    step 3-2: calculating the vegetation index correlated to biomass estimation according to the reflectivity in step 3-1;

step 3-3: calculating 8 texture feature parameters based on a gray-level co-occurrence matrix on a reflectivity image;

step 3-4: constructing a normalized difference texture index NDTI(T1,T2), NDTI(T1, T2)=(T1−T2)/(T1+T2) according to a single texture feature parameter, where T1 and T2 are respectively a certain texture feature parameter at an arbitrary band; the single texture feature parameter is one of the 8 texture feature parameters based on the gray-level co-occurrence matrix, and a certain texture feature parameter is one of the 8 texture feature parameters based on the gray-levell co-occurrence matrix;

step 3-5: rooting and washing the rice plant samples, performing fixation and drying in an oven, and weighing the rice plant samples to obtain the aboveground biomass data of the rice plant samples;

step 4: performing a correlation analysis on a spectral index, the single texture feature parameter, the texture index and the aboveground biomass, where the spectral index is one of the vegetation indices calculated according to the reflectivity in step 3-2; at the same time, performing a stepwise multiple linear regression analysis by using a data analysis software SPSS and combining the spectral index and the texture index to obtain a rice biomass estimation model, and calculating a coefficient of determination $R^2$; and evaluating performance of different regression analysis models on rice biomass estimation by comparing $R^2$;

step 5: according to field test data, verifying accuracy of the rice biomass estimation model by a cross-validation method, and calculating a relative root mean square error (RMSE):

$$RMSE = \sqrt{\frac{1}{n}\sum_{i=1}^{n}(P_i - O_i)^2}$$

where $P_i$, and $O_i$, are predicted and measured values of the ith sample respectively, and n is a total number of samples; and step 6: by comparing the RMSE of different estimation models, obtaining an optimal rice aboveground biomass estimation model:

AGB $(t\ ha^{-1})=e^{(4.179 \times NDTI(Mean800,\ Mean550)-2.559 \times NDTI(Mean800,\ Mean720)+1.924 \times MTVI2-0.644)}$ where $t\ ha^{-1}$ is a biomass unit, NDTI (Mean$_{800}$, Mean$_{550}$) is a normalized difference texture index constructed by Mean texture feature parameters at an 800 nm band and a 550 nm band, NDTI (Mean$_{800}$, Mean$_{720}$) is a normalized difference texture index constructed by the Mean texture feature parameters at the 800 nm and 720 nm bands, MTVI2 is a modified triangular vegetation index, and AGB is the aboveground biomass of rice.

2. The method for estimating the aboveground biomass of rice based on multi-spectral images of a UAV of claim 1, wherein the rice canopy multi-spectral image data in step 1 is from rice fields of different growth periods, different nitrogen application levels, different planting density treatments, and different rice varieties, where the growth periods comprise a jointing stage, a booting stage, a heading stage and a filling stage.

3. The method for estimating the aboveground biomass of rice based on multi-spectral images of a UAV of claim 1, wherein random destructive sampling of the rice plants in step 1 is specifically as follows: randomly selecting three rice plants in each region and uprooting and placing the rice plants in a bucket.

4. The method for estimating the aboveground biomass of rice based on multi-spectral images of a UAV of claim 1, wherein preprocessing of the rice canopy multi-spectral image data in step 2 is specifically as follows:

step 2-1: setting different exposure time for a camera in a darkroom, taking 100 photos, extracting a DN value of an image as a noise image, and subtracting the noise image from the original image to obtain the image with the noise removed;

step 2-2: using an integrating sphere to obtain an image of the camera under a uniform light source, obtaining a halation correction coefficient, and multiplying the image with the noise removed by the correction coefficient to obtain the image with the halation corrected;

step 2-3: obtaining internal and external parameters of a lens by using a black and white checkerboard pattern, and then correcting lens distortion with a Brown model to obtain the image with the lens distortion corrected; and step 2-4: by an empirical linear method, correcting radiation by 6 correction white cloths with different standard reflectivity, which is 3%, 6%, 12%, 22%, 48% and 56% respectively, to obtain the reflectivity image with the radiation corrected.

5. The method for estimating the aboveground biomass of rice based on multi-spectral images of a UAV of claim 1, wherein the vegetation indices in step 3-2 comprise:

a visible atmospherically resistant index VARI=($R_{550}$−$R_{680}$)/($R_{550}$+$R_{680}$−$R_{490}$), a normalized green-red difference index NGRDI=($R_{550}$−$R_{680}$)/($R_{550}$+$R_{680}$), a chlorophyll red edge $CI_{red\ edge}$=($R_{800}$/$R_{720}$)−1, A spectral index DATT=($R_{800}$−$R_{720}$)/($R_{800}$−$R_{680o}$), a normalized vegetation index NDVI=($R_{800}$−$R_{680}$)/($R_{800}$+$R_{680}$), a greenness normalized vegetation index GNDVI=($R_{800}$−$R_{550}$)/($R_{800}$+$R_{550}$), a modified triangular vegetation index $$MTVI2 = \frac{1.5[1.2(R_{800} - R_{550}) - 2.5(R_{680} - R_{550})]}{\sqrt{(2R_{800} + 1)^2 - (6R_{800} - 5\sqrt{R_{680}})} - 0.5},$$

an optimized soil adjusted vegetation index OSAVI=(1+ 0.16)($R_{800}$−$R_{680}$)/($R_{800}$+$R_{680}$+0.16), where $R_{800}$, $R_{720}$, $R_{680}$, $R_{550}$ and $R_{490}$ represent reflectivity at the 800 nm, 720 nm, 680 nm, 550 nm and 490 nm bands respectively.

6. The method for estimating the aboveground biomass of rice based on multi-spectral images of a UAV of claim 1, wherein the texture feature parameters in step 3-3 comprise: mean, variance, uniformity, contrast, heterogeneity, entropy, angular second moment and correlation, where the mean reflects the average of texture, the variance reflects magnitudes of texture change, the uniformity reflects homogeneity of local texture, the contrast reflects sharpness of the texture, the heterogeneity is used to detect similarity, the entropy reflects a degree of non-uniformity or complexity of the texture in the image, the angular second moment reflects uniformity of gray-level distribution and thickness of the texture of the image, and the correlation reflects consistency of the image texture.

7. The method for estimating the aboveground biomass of rice based on multi-spectral images of a UAV of claim 1, wherein fixation and drying of the rice plant samples in an oven in steps 3-5 are specifically as follows: performing fixation at 108° C. for 30 min, and performing drying at 80° C. to constant weight.

8. The method for estimating the aboveground biomass of rice based on multi-spectral images of a UAV of claim 1, wherein the coefficient of determination in step 4 is:

$$R^2 = 1 - \frac{\sum_i (y_i - y_i')^2}{\sum_i (y_i - \overline{y})^2}$$

where $y_i$ and $y'_i$ are measured and predicted values of the ith sample respectively, $\overline{y}$ is an average of the measured values, and n is the total number of the samples.

* * * * *